(12) United States Patent
Mann et al.

(10) Patent No.: US 6,306,316 B1
(45) Date of Patent: Oct. 23, 2001

(54) PHOTOCHROMIC PLASTIC OBJECT

(75) Inventors: Claudia Mann, Munich; Manfred Melzig, Wessling; Udo Weigand, Munich, all of (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 09/509,192

(22) PCT Filed: Jul. 22, 1999

(86) PCT No.: PCT/EP99/05258

§ 371 Date: Jun. 2, 2000

§ 102(e) Date: Jun. 2, 2000

(87) PCT Pub. No.: WO00/05602

PCT Pub. Date: Feb. 3, 2000

(30) Foreign Application Priority Data

Jul. 23, 1998 (DE) ............................................. 198 33 013

(51) Int. Cl.[7] ................................. G02B 5/23; G02C 7/10
(52) U.S. Cl. ............................................. 252/586; 351/163
(58) Field of Search ............................. 252/586; 351/163

(56) References Cited

U.S. PATENT DOCUMENTS

| | | | |
|---|---|---|---|
| 4,818,096 | * 4/1989 | Heller et al. ........................ 351/163 |
| 4,968,454 | * 11/1990 | Crano et al. . | |
| 5,066,818 | * 11/1991 | Gemert et al. ........................ 252/586 |
| 5,429,774 | * 7/1995 | Kumar ................................... 252/586 |
| 5,466,398 | * 11/1995 | Van Gemert .......................... 252/586 |
| 5,753,146 | * 5/1998 | Van Gemert .......................... 252/586 |
| 5,770,115 | * 6/1998 | Misura .................................. 252/586 |

* cited by examiner

Primary Examiner—Philip Tucker
(74) Attorney, Agent, or Firm—Crowell & Moring LLP

(57) ABSTRACT

The invention relates to photochromic plastic objects comprising a plastic material and at least two photochromic pyran derivatives, which are introduced therein and, in each case, have an aryl group, which is linked to the carbon atom adjacent to the pyran oxygen atom and is substituted with at least one group containing at least one nitrogen atom, the longest wavelength absorption maximum of the light-stimulated form of the one pyran derivative lying above 550 nm and the longest wavelength absorption of the light-stimulated form of the other pyran derivative lying below 550 nm and the pyran derivative, absorbing at the shorter wavelength, being selected from 3[H]-naphtho[2,1-b]pyrans and the pyran derivative, absorbing at the longer wavelength, being selected from indeno[2,1-f]naphtho[1,2-b]pyrans or spiro-9-fluoreno[1,2-b]pyrans. The photochromic plastic objects of the present invention are distinguished particularly by a long service life, a good decolorization rate, by the absence of yellowing as well as by a neutral perceived color, it being possible to dispense largely or completely with the use of stabilizers and the like in the inventive plastic objects.

15 Claims, 1 Drawing Sheet

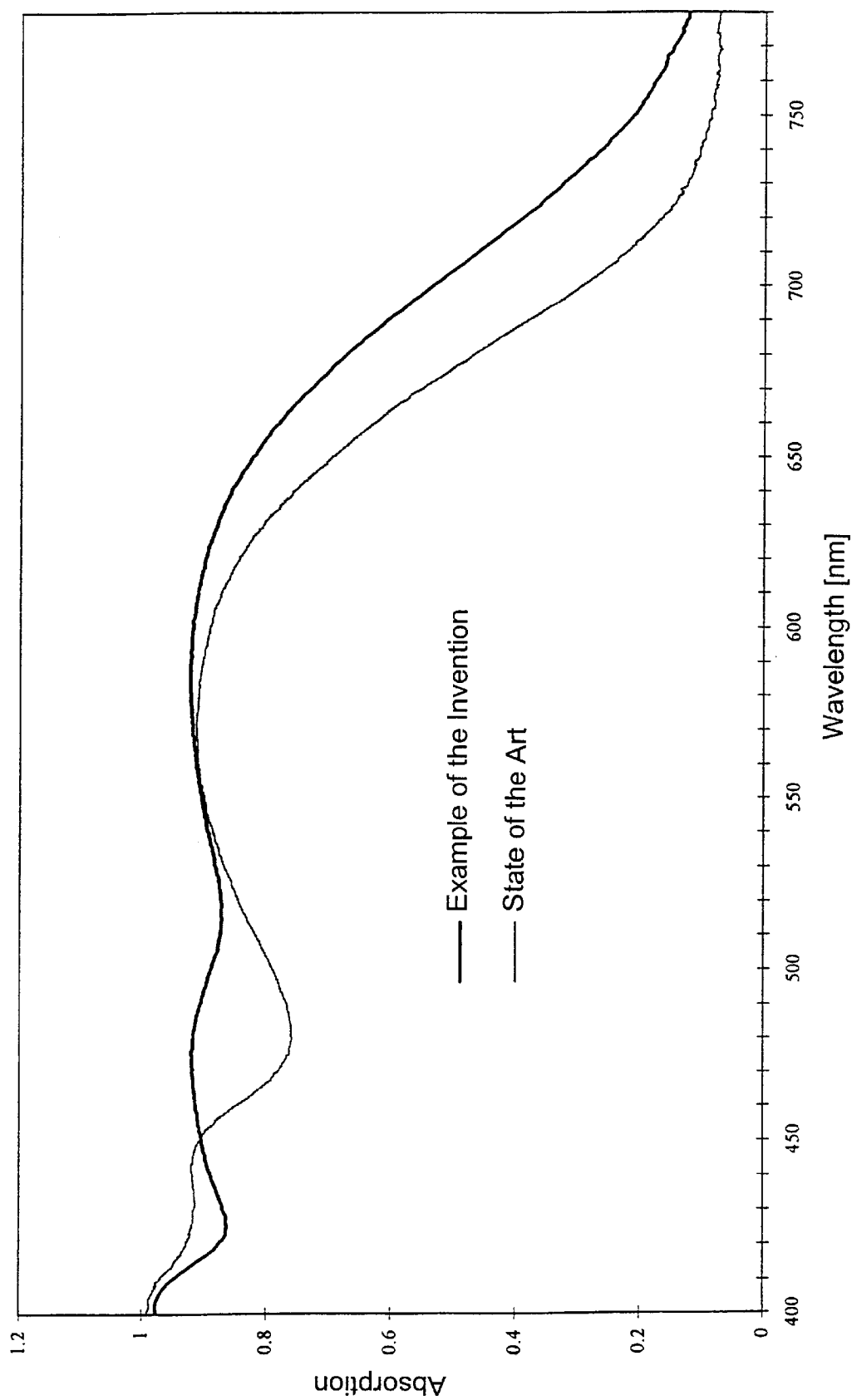
FIG. 1 COMPARISON OF THE ABSORPTION IN VISIBLE LIGHT IN THE DARKENED STATE

PHOTOCHROMIC PLASTIC OBJECT

BACKGROUND OF THE INVENTION

The invention relates to photochromic plastic objects, which contain a specific combination of at least two pyran derivatives, each substituted with a group containing nitrogen, particularly with an amino group or with a heterocyclic nitrogen group, and which are distinguished particularly by a long service life, a good decolorization rate, the absence of yellowing as well as by a neutral perceived color, it being possible to dispense largely or completely with the use of stabilizers and the like in the inventive plastic objects. The invention furthermore relates to the use of said photochromic plastic objects.

Different classes of dyes are known which, when irradiated with light of a particular wavelength, especially with sunlight, change their color reversibly. This is due to the fact that, because energy is supplied in the form of light, these dye molecules change over into a stimulated colored state, which they leave once again when the supply of energy is interrupted in order to return to their colorless or at least hardly colored normal state. These photochromic dyes have recently been used increasingly in various ways in plastic products.

Photochromic plastic products, especially eyeglass lenses, have been obtainable commercially since the early 1960s. The first lenses, which were disseminated increasingly were, for example, Rodenstock Perfalit Colormatic® (Trademark of the Optischen Werke G. Rodenstock) or Transitions® (Trademark of Transitions Optical Inc.), which contained only spirooxazines as photochromic dyes. In the early 1990s, products such as Transitions® Plus (since 1992), Transitions Eurobraun® (since 1994) and Hoya Sunbrown® (since 1994) of the Hoya Lens Corporation or Rodenstock Perfalit Colormatic® neu (since 1995) reached the market, which already contained pyrans in addition to spirooxazines and/or fulgides. Newer products, such as Transitions® III, preferably use pyrans, especially naphthopyrans and larger ring systems derived from these.

In U.S. Pat. No. 4,818,096, compositions are described, which contain at least two photochromic compounds, one of the at least two photochromic compounds being a spirobenzopyran or spironaphthopyran, substituted in the 2 spiro position with an adamantyle group, and the other a benzopyran or naphthopyran, substituted with a nitrogen-containing group in the 2 position of the pyran ring. However, these compositions exhibit, on the one hand, unsatisfactory decolorization rates and, on the other, owing to the fact that the compounds are present to some extent (about 10 to 20%) in the open form, an inherent color, which interferes with the intended use.

In U.S. Pat. No. 5,753,146, compositions are described, which contain at least two photochromic naphthopyran compounds, especially 3[H]-naphtho[2,1-b]-pyran and 2[H]-naphtho[1,2-b]pyran. However, these naphthopyran compounds do not have any amino-substituted aryl groups, which are linked to the carbon atom adjacent to the oxygen atom of the pyran ring. With mixtures like those described in U.S. Pat. No. 5,753,146, gray or brown glasses, which are relatively color neutral, can be produced. One of the main problems of such glasses is, however, the rapid aging, which becomes noticeable, on the one hand, by a decreasing darkening and, on the other, by a yellowing.

Even mixtures of antioxidants, UV absorbers and hindered amines as light stabilizers, which have only been ascertained in protracted series of experiments, are able to mitigate the aforementioned problem with respect to a rapid aging only inadequately. This is also indicated in the recently published U.S. Pat. No. 5,770,115, in which a composition, comprising (a) 5 to 50% by weight of at least one polyphenol antioxidant, (b) 5 to 50% by weight of an organic UV absorber and (c) 10 to 90% by weight of at least one hindered amine light stabilizer, based on the total amount of stabilizer, is described, the ratio by weight of naphthopyran to stabilizer being 2.5:1 to 1.5:1. Even the best of these mixtures at the very least still doubles the original b* value in the a*–b* color space of the CIELAB color system and has a performance loss of at least 20% in the course of the aging test.

Moreover, migration of almost all of the additives used occurs upon warming. When eyeglass lenses are coated, this can lead to defects, such as layer detachment. This is frequently the case, particularly when there is photochromic surface coloration.

Further disadvantages of the compositions, available in the state of the art, lie therein that, without exception, the color, perceived for plastic objects in the form of glasses, is not neutral, since the spectral absorption in the range from 400 to 650 nm does not have a constant value. Moreover, for corresponding applications, the long wave absorption must usually also fulfill certain requirements. Certain glasses, when darkened to an extreme extent by intensive UV radiation, for example, when (glacier) skiing, exhibit the unpleasant property of color distortion. This is due to the fact that the eye, with this darkening, receives very much more information from the wavelength region above 650 nm than from the region below 650 nm; therefore, for example, snow appears to be tinted red.

SUMMARY OF THE INVENTION

It is therefore an object of the present invention to make available a photochromic transparent plastic object, which is to contain a combination of photochromic dyes without having the aforementioned disadvantages, such as a low aging stability, an inherent color and an unsatisfactory decolorization rate. Moreover, it shall largely be possible to dispense with the use of stabilizers, in order to avoid the above-described disadvantages of the state of the art. Furthermore, the plastic objects shall, as far as possible, have a neutral, perceived color, especially in the case of gray glasses, that is, the spectral absorption ranging at wavelengths from 400 to 650 nm should have an almost constant value. Moreover, the transparent, photochromic plastic object, constructed as an ophthalmic lens, should have a transmission of at least about 80% in the fully decolorized, uncoated state.

This objective is accomplished by the embodiments, of the invention described and claimed herein after. In particular, a photochromic plastic object is made available, which comprises a plastic material and at least two photochromic pyran derivatives, which are introduced therein and, in each case, have an aryl group, which is linked to the carbon atom adjacent to the pyran oxygen atom and is substituted with at least one group containing at least one nitrogen atom, the longest wavelength absorption maximum of the light-stimulated form of the one pyran derivative lying above 550 nm and the longest wavelength absorption of the light-stimulated form of the other pyran derivative lying below 550 nm and the pyran derivative, absorbing at the shorter wavelength, being selected from 3[H]-naphtho[2,1-b]pyrans and the pyran derivative, absorbing at the longer wavelength, being selected from indeno[2,1-f]naphtho[1,2-b]pyrans or spiro-9-fluoreno[1,2-b]pyrans.

DESCRIPTION OF PREFERRED EMBODIMENTS

Preferably, the longest wavelength absorption maxima of the pyran derivatives, used pursuant to the invention, differ by more than 50 nm and by less than 150 nm.

The group, which contains at least one nitrogen atom and is linked to an aryl group, which in turn is linked covalently to the carbon atom of the respective pyran derivatives, adjacent to the pyran oxygen atom, preferably is an amino group or a heterocyclic group containing at least one nitrogen atom (heterocyclic nitrogen group).

The amino group may be unsubstituted, monosubstituted or disubstituted. The substituents can be selected from the group comprising hydroxy, $(C_1-C_6)$ alkyl, $(C_1-C_6)$ alkoxy, $(C_1-C_6)$ alkoxy $(C_1-C_6)$ alkyl, phenyl and phenyl $(C_1-C_6)$ alkyl and can be the same or different. The heterocyclic nitrogen groups may or may not be aromatic. Examples of such heterocyclic nitrogen groups include pyrrole, pyrazole, imidazole, imidazolidine, pyridine, pyrimidine, pyrazine, indole, indazole, quinoline, isoquinoline, purine, pyrimidine, phenanthridine, acridine, phenazine, carbazole, thiazole, oxazole, morpholine, thiomorpholine, pyrrolidine, pyrazolidine, piperidine and piperazine. Thiomorpholine, morpholine, pyrrolidine, piperidine, pyrazolidine, imidazolidine and piperidine are preferred as heterocyclic groups.

Of course, this heterocyclic group can be unsubstituted, monosubstituted or disubstituted, the substituents once again being selected from the group comprising hydroxy, $(C_1-C_6)$ alkyl, $(C_1-C_6)$ alkoxy, $(C_1-C_6)$ alkoxy $(C_1-C_6)$ alkyl, phenyl and phenyl $(C_1-C_6)$ alkyl and halogen. If two substituents are present, they may, of course, be identical or different.

Preferably, the amino group or the heterocyclic nitrogen group is linked in the para position via the nitrogen to the aryl group of the photochromic pyran derivatives, used pursuant to the invention.

In a further embodiment of the present invention, a further aromatic group, selected from the group comprising a substituted or unsubstituted aryl group and a substituted or unsubstituted heteroaryl group, is linked to the carbon atom, adjacent to the pyran oxygen atom, of the pyran derivatives used pursuant to the invention. The heteroaryl group may, for example, be a furyl or thienyl group and the aryl group may, for example, be a phenyl, naphthyl or phenanthryl group. The substituents of these aryl or heteroaryl groups may be the same as those previously given for the first aryl group, which is linked covalently to the carbon atom of the respective pyran derivatives, which is adjacent to the pyran oxygen atom. The aryl group may thus also be an aryl group, as defined above, inasmuch as it is substituted with at least one group containing at least one nitrogen atom.

The specific combination of the pyran derivatives, used pursuant to the invention, leads to a plastic object, the spectral absorption of which has almost a constant value at wavelengths ranging from 400 to 650 nm, that is, a plastic object which, in the darkened state, has a spectral absorption of not less than 80% continuously at wavelengths ranging from 400 to 650 nm. As a result of the specific combination of the pyran derivatives used pursuant to the invention, an uncoated ophthalmic lens, formed from the inventive plastic object, has a spectral transmission, measured in the fully darkened state at 23° C. according to prEN ISO 8980, of less than 20%. The transmission of an uncoated ophthalmic lens of the inventive plastic object, fully decolorized, is 80% or more.

Due to the specific combination of the pyran derivatives, which are used pursuant to the invention and substituted with an amino group or a pyran derivative substituted with a heterocyclic nitrogen group, plastic objects can be prepared which, in the darkened state at 700 nm, have an absorption of more than 50%, preferably more than 55% and especially more than 60%, measured at 23° C.

Furthermore, due to the specific combination of the pyran derivatives, which are used pursuant to the invention and are substituted with an amino group or a pyran derivative substituted with a heterocyclic nitrogen group, plastic objects furthermore can be prepared, which are distinguished by the fact that the difference in the $V_\lambda$ absorption according to prEN ISO 8980 and measured at 23° C. and 40° C. is not greater than 25%, preferably not greater than 20% and especially not greater than 15%.

Surprisingly, due to the specific combination of the inventive pyran derivatives, a plastic object can be prepared, the absorption curve of which, measured in the fully darkened state at 23° C. according to prEN ISO 8980, is distinguished owing to the fact that the maximum absorption difference in the region, in which the spectral brightness sensitivity of the human eye for photoptic vision (2° observer) is at least 10% of the maximum value, is less than 15% and especially less than 10%.

As stated above, the pyran derivative, which is used pursuant to the invention and absorbs at shorter wavelengths, is a 3[H]-naphtho[2,1-b]pyran. For example, the 3[H]-naphtho[2,1-b]pyrans, which are substituted with an amino group or a heterocyclic nitrogen group and are described in the German patent 198 20 781, can be used in the inventive plastic objects. As preferred examples of the 3[H]-naphtho[2,1-b]pyrans, used pursuant to the invention, 3-(4-diphenylaminophenyl)-3-(2-fluorophenyl)-3H-naphtho [2,1-b]pyran, 3-(4-dimethylaminophenyl)-3-(2-fluorophenyl)-3H-naphtho[2,1-b]pyran, 3-(2-fluorophenyl)-3-[4-(N-morpholinyl)phenyl]-3H-naphtho[2,1-b]pyran, 3-(2-fluorophenyl)-3-[4-(N-piperidinyl)phenyl]-3H-naphtho[2,1-b]pyran, 3-(4-dimethylaminophenyl)-6-(N-morpholinyl)-3-phenyl-3H-naphtho [2,1-b]pyran, 6-(N-morpholinyl)-3-[4-(N-morpholinyl)phenyl]-3-phenyl-3H-naphtho[2,1-b]pyran, 6-(N-morpholinyl)-3-phenyl-3-[4-(N-piperidinyl)phenyl]-3H-naphtho[2,1-b]pyran and 6-(N-morpholinyl)-3-phenyl-3-[4-(N-pyrrolidinyl)phenyl]-3H-naphtho [2,1-b]pyran can be listed.

The pyran derivative, which is used pursuant to the invention and absorbs at longer wavelengths, is an indeno [2,1-f]naphtho[1,2-b]pyran derivative or a spiro-9-fluoreno [1,2-b]pyran derivative. Of course, a mixture of these can also be used. These pyran derivatives, which absorb at longer wavelengths, can also be benzo-annellated. For example, the indeno[2,1-f]naphtho[1,2-b]pyrans, which are described in WO 99/15518 and substituted with an amino group or a heterocyclic nitrogen group, or the spiro-9-fluoreno[1,2-b]pyrans, which are described in the German patent 199 02 771 and substituted with an amino group or a heterocyclic nitrogen group, can be used in the inventive plastic objects. As preferred examples of these, 3,13-diphenyl-3-(4-diphenylaminophenyl)-13-hydroxy-6-methoxy-indeno[2,1-f]-naphtho[1,2-b]pyran, 13-(2,5-dimethylphenyl)-3-(4-diphenylaminophenyl-13-hydroxy-6-methoxy-3-phenyl-indeno[2,1-f]-naphtho[1,2-b]pyran, 13-(2,5-dimethylphenyl)-3-(4-diphenylaminophenyl)-13-hydroxy-3-phenyl-indeno[2,1-f]-naphtho[1,2-b]pyran,
spiro-9-fluoreno-13'-[3-(4-dimethylaminophenyl)-6-methoxy-3-phenyl-indeno[2,1-f]-naphtho[1,2-b]pyran],
spiro-9-fluoreno-13'-[3-(4-dimethylaminophenyl)-3-phenyl-indeno[2,1-f]-naphtho[1,2-b]pyran],
spiro-9-fluoreno-13'-[3-(4-diphenylaminophenyl)-6-methoxy-3-phenyl-indeno[2,1-f]-naphtho[1,2-b]pyran],
spiro-9-fluoreno-13'-[3-(4-diphenylaminophenyl)3-phenyl-indeno[2,1-f]-naphtho [1,2-b]pyran],
spiro-9-fluoreno-13'-{3-[4-(N-morpholinyl)phenyl]-6-methoxy-3-phenyl-indeno[2,1-f]-naphtho[1,2-b]pyran},
spiro-9-fluoreno-13'-{3-[4-(N-morpholinyl)phenyl]-3-phenyl-indeno[2,1-f]-naphtho[1,2-b]pyran},
spiro-9-fluoreno-13'-{6-methoxy-3-phenyl-3-[4-(N-piperidinyl)phenyl]-indeno[2,1-f]naphtho[1,2-b]pyran} and
spiro-9-fluoreno-13'-{3-phenyl-3-[4-(N-piperidinyl) phenyl]-indeno[2,1-f]naphtho[1,2-b]pyran} are listed.

It is self-evident that optionally further photochromic dyes, especially further pyran derivatives, such as naphthopyrans, may be contained in addition to the two absolutely essential pyran derivatives in the inventive plastic object. By these means, the best possible color neutrality can be obtained. It is also possible to achieve special effects selectively. However, for the properties of the photochromic work, such as the darkening, the temperature dependence of the darkening, the absorption behavior beyond 650 nm and the aging behavior, such additional dyes are not necessary. If anything, their effect on the properties named is slight.

As carrier or matrix for the at least two photochromic dyes in the form of the pyran derivatives described above, the plastic object contains one or more plastic materials. The plastic materials used can be the plastics, which can usually be used in the state of the art, especially for ophthalmic purposes. For example, the plastic material may be selected from poly($C_1$–$C_{12}$-alkyl) methacrylates, polyoxyalkylene methacrylates, polyalkoxyphenol methacrylates, cellulose acetate, cellulose triacetate, cellulose acetate propionate, cellulose acetate butyrate, polyvinyl acetate, polyvinyl alcohol, polyvinyl chloride, polyvinylidene chloride, polycarbonates, polyesters, polyurethanes, polyethylene terephthalate, polystyrene, poly-α-methylstyrene, polyvinyl butyrate, copoly(styrene methyl methacrylate), copoly (styrene acrylonitrile) and polymers of components of the group, consisting of polyol(allyl carbonate) monomers, polyfunctional acrylate, methacrylate or diethylene glycol dimethacrylate monomers, ethoxylated bisphenol A dimethacrylate monomers, diisopropenylbenzene monomers, ethylene glycol bismethacrylate monomers, poly (ethylene glycol) bismethacrylate monomers, ethoxylated phenol methacrylate monomers, alkoxylated polyalcohol acrylates and diallylidene pentaerythritol monomers or mixtures thereof.

BRIEF DESCRIPTION OF THE DRAWING

FIG. 1 shows the absorption curve of an object of this invention and of the prior art.

The inventive, photochromic, plastic objects are distinguished by a long service life, good decolorization rates, an absence of yellowing as well as a neutral perceived color, it being possible to do largely or completely without stabilizers and the like in the inventive plastic objects. Moreover, the plastic objects fulfill in a particularly advantageous manner the requirement, especially in the case of gray glasses, to show as neutral a perceived color as possible.

Such a neutral perceived color is brought about by an almost uniform absorption at wavelengths ranging from 400 to 650 nm.

By means of a typical example, FIG. 1 shows the spectral absorption of an inventive plastic object with the specific combination of two photochromic pyran derivatives, which can be used pursuant to the invention, in the darkened state in comparison to the absorption of a typical object, available in the state of the art, such as the object, which is described in U.S. Pat. No. 5,753,146, and does not contain the specific combination of pyran derivatives, used within the scope of the present invention, and instead contains two naphthopyran compounds, which do not have amino-substituted aryl groups. As can be inferred from FIG. 1, the absorption curve of a typical object, available in the state of the art, such as the object described in U.S. Pat. No. 5,753,146, shows a clear lowering ("dip") in the wavelength range from 460 to 500 nm and falls clearly below 80% and has an absorption of only 30% at 700 nm. In contrast to this, the absorption curve of the inventive example consistently has an almost constant value of more than 80% in the wavelength range from 400 to 650 nm and an absorption of more than 50% at 700 nm. As a result of this, a neutral perceived color is attained on the one hand and the occurrence of color distortions prevented on the other.

The inventive, photochromic plastic object offers manifold possibilities for use. For example, the inventive, photochromic plastic object can be used as a so-called all-around glass. Preferably, the inventive, photochromic plastic object is used as an optical element, for example, as a lens for eyeglasses. Previously known plastic lenses have a refractive index, measured at the sodium D line, of 1.49 to 1.76. Lenses with a refractive index of 1.50 to 1.60, measured at the sodium D line, may preferably be obtained through the use of the inventive, photochromic plastic objects.

What is claimed is:

1. A photochromic plastic object comprising a plastic material and at least two photochromic pyran compounds introduced into said plastic material, wherein each of said photochromic pyran compounds has an aryl group linked to the carbon atom adjacent the pyran oxygen atom, and each said aryl group is substituted with at least one group containing at least one nitrogen atom, one of said photochromic pyran compounds in light stimulated form having a longest wavelength absorption maximum lying above 550 nm and being selected from the group consisting of indeno[2,1-f] naphtho[1,2-b]pyran compounds and spiro-9-fluoreno[1,2-b]pyran compounds, and another of said photochromic pyran compounds in light-stimulated form having a longest wavelength absorption maximum lying below 550 nm and being selected from the group consisting of 3[H]-naphtho [2,1-b]pyran compounds.

2. A photochromic plastic object according to claim 1, wherein said two photochromic pyran compounds have longest wavelength absorption maxima which differ from each other by more than 50 nm but less than 150 nm.

3. A photochromic plastic object according to claim 1, wherein said group containing at least one nitrogen atom is an unsubstituted, monosubstituted or disubstituted amino group or a heterocyclic group containing at least one nitrogen atom.

4. A photochromic plastic object according to claim 3, wherein said group containing at least one nitrogen atom is a heterocyclic group selected from pyrrole, pyrazole, imidazole, imidazolidine, pyridine, pyrimidine, pyrazine, indole, indazole, quinoline, isoquinoline, purine, phenanthridine, acridine, phenazine, carbazole, thiazole, oxazole, morpholine, thiomorpholine, pyrrolidine, pyrazolidine, piperidine and piperazine.

5. A photochromic plastic object according to claim 1, wherein said group containing at least one nitrogen atom is linked via the nitrogen atom to the para-position of the aryl group of the photochromic pyran compound which in turn is linked to the carbon atom adjacent the pyran oxygen atom.

6. A photochromic plastic object according to claim 1, wherein a further aromatic group is linked to the carbon atom adjacent the pyran oxygen atom, said further aromatic group being selected from the group consisting of substituted and unsubstituted aryl groups and substituted and unsubstituted heteroaryl groups.

7. A photochromic plastic object according to claim 1, wherein said plastic material is selected from the group consisting of poly($C_1$–$C_{12}$-alkyl) methacrylates, polyoxyalkylene methacrylates, polyalkoxyphenol methacrylates, cellulose acetate, cellulose triacetate, cellulose acetate propionate, cellulose acetate butyrate, polyvinyl acetate, polyvinyl alcohol, polyvinyl chloride, polyvinylidene chloride, polycarbonates, polyesters, polyurethanes, polyethylene terephthalate, polystyrene, poly-α-methylstyrene, polyvinyl butyrate, copoly(styrene methyl methacrylate), copoly(styrene acrylonitrile), and polymers of components selected from the group consisting of polyol(allyl carbonate) monomers, polyfunctional acrylate, methacrylate or diethylene glycol dimethacrylate monomers, ethoxylated bisphenol A dimethacrylate monomers, diisopropenylbenzene monomers, ethylene glycol bismethacrylate monomers, poly (ethylene glycol) bismethacrylate monomers, ethoxylated phenol methacrylate monomers, alkoxylated polyalcohol acrylates and diallylidene pentaerythritol monomers and mixtures thereof.

8. A photochromic plastic object according to claim 1, wherein said object exhibits a darkened state in which it has a consistent spectral absorption of at least 80% at wavelengths from 400 to 650 nm.

9. A photochromic plastic object according to claim 1, wherein said object is an ophthalmic lens which when uncoated and in a fully darkened state has a spectral transmission of less than 20% measured at 23° C. according to prEN ISO 8980.

10. A photochromic plastic object according to claim 1, wherein said object is an ophthalmic lens which when uncoated and in a fully decolorized state has a spectral transmission of at least 80%.

11. A photochromic plastic object according to claim 1, wherein said object in a darkened state has an absorption of more than 50% at 23° C. and 700 nm.

12. A photochromic plastic object according to claim 1, wherein said object exhibits a difference in $V_\lambda$ absorption measured at 23° C. and 40° C. according to prEN ISO 8980 of at most 25%.

13. A photochromic plastic object according to claim 1, wherein said photochromic plastic object is an optical element.

14. A photochromic plastic object according to claim 13, wherein said photochromic plastic object is a lens.

15. A photochromic plastic object according to claim 14, wherein said lens has a refractive index, measured at the sodium D line, in the range from 1.50 to 1.60.

* * * * *